United States Patent [19]
Lutz et al.

[11] 3,955,848
[45] May 11, 1976

[54] AUTOMOBILE ROOF WITH PIVOTABLE VENT PANEL

[75] Inventors: Alfons Lutz, Emmering; Horst Bienert, Gauting, both of Germany

[73] Assignee: Webasto-Werk W. Baier KG, Stockdorf, near Munich, Germany

[22] Filed: June 19, 1974

[21] Appl. No.: 481,358

[30] Foreign Application Priority Data
June 20, 1973 Germany............................ 2331329

[52] U.S. Cl. ............................ 296/137 B; 16/171; 98/2.14
[51] Int. Cl.² ........................................... B60J 7/00
[58] Field of Search ......... 296/137 J, 137 A, 137 B, 296/137 E, 137 F; 98/2.14; 49/398, 399, 400; 16/171, 172, 174, 176, 177

[56] References Cited
UNITED STATES PATENTS

| | | | |
|---|---|---|---|
| 808,766 | 1/1906 | Lehmann | 16/171 X |
| 1,221,987 | 4/1917 | Harris | 16/171 |
| 1,480,274 | 1/1924 | La Barre | 98/2.14 |
| 1,981,897 | 11/1934 | Bishop | 296/137 J X |
| 2,372,164 | 3/1945 | Woodhams | 98/2.14 |
| 3,537,212 | 11/1970 | Gilles | 16/172 X |
| 3,815,701 | 6/1974 | Mayhew | 16/172 X |

FOREIGN PATENTS OR APPLICATIONS

| | | | |
|---|---|---|---|
| 65,908 | 3/1943 | Norway | 296/137 J |

Primary Examiner—Robert J. Spar
Assistant Examiner—Donald W. Underwood
Attorney, Agent, or Firm—Otto John Munz

[57] ABSTRACT

An upwardly pivotable vent panel assembly as part of an automobile roof structure in which the horizontal pivot connection is defined by a pair of insertion tongues on the forward end of the vent panel engaging matching slots in a vertical wall portion of the roof, the pivot connection being readily disengageable and the lifting linkage being releasable for complete removal of the panel.

5 Claims, 3 Drawing Figures

AUTOMOBILE ROOF WITH PIVOTABLE VENT PANEL

BACKGROUND OF THE INVENTION

1. Field of the Invention

The present invention relates to openable rigid panels arranged in the roof structure of automobiles, and in particular to upwardly pivotable rigid roof vent panels which, when closed, sealingly engage a roof opening in flush alignment with the curvature of the roof structure.

2. Description of the Prior Art

A variety of openable rigid roof panels are known from the prior art. Most of these are so-called sliding roof panels which are opened by lowering one panel portion and by retracting the panel under the adjacent stationary roof portion. Other sliding roof panels are openable in two modes, by either lowering and retracting the panel, or by upwardly pivoting the rear portion of the panel. These sliding roof structures have received widespread acceptance in connection with present-day passenger cars, because the openable roof panel is relatively rigid and, when closed, forms a substantially continuous contour with the surrounding roof portions.

Also known from the prior art are roof structures with openable vent panels where the rear part of the panel is pivotable upwardly from the roof opening, while the front end of the panel is lowered under the adjacent stationary roof portion so as to permit at least partial retraction of the vent panel under the forward stationary portion of the roof structure. Still other known roof vent panels are openable by a simple upward pivoting motion on one panel edge, a hinge being provided at the opposite edge.

These known prior art structures have various shortcomings, among them being their not very attractive outward appearance and their inadequate size. Also, most of these prior art roof vent panels are difficult to assemble and, because of their complexity, are costly in production and therefore competitively inferior.

SUMMARY OF THE INVENTION

It is a primary objective of the present invention to provide an improved automobile roof structure with an upwardly pivotable rigid roof panel which can be installed and removed with extreme ease and which, because of its simple design, is very economical in production.

The present invention proposes to attain the above objective by suggesting an upwardly pivotable rigid roof vent panel arranged in a matching opening of an automobile roof, the panel being pivotable upwardly on its rear portion around a horizontal pivot axis near its front edge, the horizontal pivot axis being defined by at least one insertion tongue engaging a tongue-receiving aperture in a vertical wall of the adjacent stationary roofing portion.

In a preferred embodiment of the invention, the pivot connection includes two insertion tongues, and the upward-pivoting motion of the roof vent panel is obtained by means of a pair of lifting linkages attached to the rear portion of the panel. These lifting linkages are connected to the vent panel by means of manually releasable fasteners. Thus, the opened vent panel can be completely removed from the roof opening, by simply disconnecting its lifting linkages and by pulling it out of the pivot connection constituted in part by the aforementioned insertion tongues. The ease with which the proposed novel roof vent panel is removable from the roof makes it possible even for an untrained person to do this, thus giving the automobile user an additional possibility of adapting the automobile to particular weather and driving conditions.

The horizontal pivot axis, as constituted by the insertion tongues engaging matching apertures in a wall of the roof structure, can take the simple form of a pair of spaced, downwardly offset sheet metal tongues attached to the panel, the cooperating apertures being provided in a vertical wall portion of the rain channel frame surrounding the roof opening, and each aperture carrying a rubber collar forming a seal around the insertion tongue.

The pivot axis is thus provided at the point of contact between the aforementioned aperture collar and the insertion tongue. However, the invention also envisions the possibility of providing pivotability at a place on the insertion tongues outside these apertures, with two portions of each insertion tongue being hinged together, for example.

BRIEF DESCRIPTION OF THE DRAWINGS

Further special features and advantages of the invention will become apparent from the description following below, when taken together with the accompanying drawing, which illustrates, by way of example, an embodiment of the invention, represented in the various figures as follows.

DESCRIPTION OF THE PREFERRED EMBODIMENT

Figure 1:
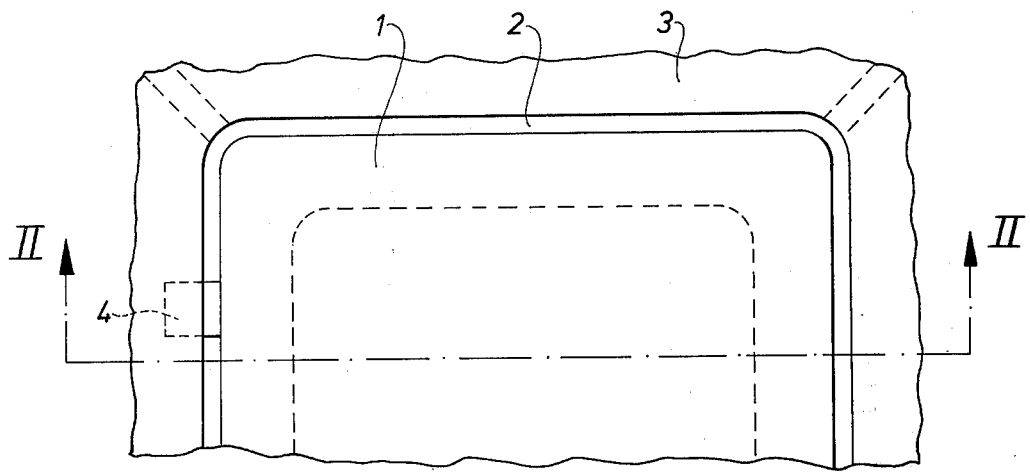
FIG. 1 shows in a partial top plan view an automobile roof structure with a closed vent panel embodying the invention.
Figure 2:
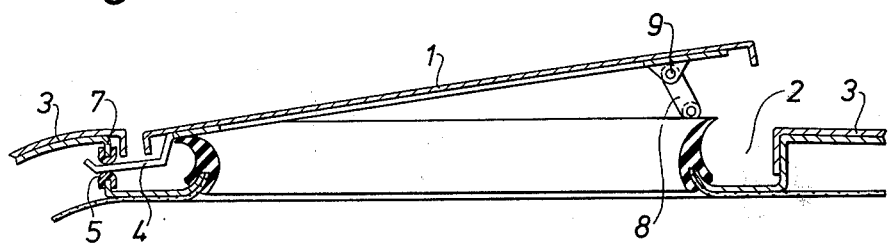
FIG. 2 is a vertical longitudinal cross section through the roof structure, as taken along line II—II of FIG. 1, but with the vent panel shown in the open position.
Figure 3:
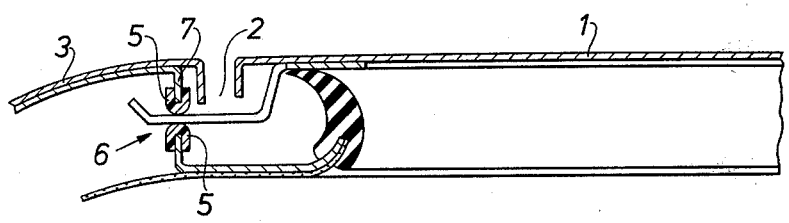
FIG. 3 shows an enlarged portion of FIG. 2, with the vent panel in its closed position.

Referring to FIGS. 1–3 of the drawing, there can be seen a rigid vent panel 1 arranged within a matching roof opening 2 and serving as a closure therefor, in cooperation with the surrounding stationary roof portion 3. The closed vent panel forms a smooth, flush continuation of the overall curvature of the roof structure. The generally rectangular vent panel 1 has a downwardly oriented peripheral ledge to which may be attached a flexible seal (not shown).

As can be seen in FIG. 2, the roof vent panel 1 is openable in an upward-pivoting motion, the rear portion of panel 1 being lifted by means of a pair of laterally spaced lifting linkages 8. As the rear end of vent panel 1 is lifted, its front end pivots around a pivot axis which is associated with the forward edge of the panel. This pivot axis is constituted by a pair of laterally spaced insertion tongues 4 which are downwardly offset from vent panel 1 and extend forwardly into two matching apertures or slots 6 arranged in a vertical frame wall portion 7 of the stationary roof structure 3. Between the insertion tongues 4 and the edges of the slots 6 is preferably arranged a rubber collar 5 which, by virtue of its resiliency, accommodates the pivoting motion and also serves as a seal against the penetration of water under the stationary roof structure. From FIGS. 2 and 3, it can be seen that the aforementioned vertical wall 7 is part of a rain channel profile arranged underneath the edge of the roof opening.

The upwardly pivoted vent panel 1 is adapted to be quickly and effortlessly removed from the roof. For this purpose, the lifting linkages 8 are connected to panel 1 by quick-release connecting means, for example a pin 9. Once pin 9 is released, the vent panel 1 can be completely removed, by simply withdrawing it from the pivot connection in the forward portion of the roof structure, the insertion tongues of panel 1 being arranged to slide into and out of the cooperating slots 6. For reasons of safety, the connecting pins 9 may be of the bayonet-type, having known safety features preventing accidental release of the pin.

The insertion tongues illustrated in FIGS. 2 and 3 are sheet metal formations and are directly attached to the rigid vent panel 1. At their forward end, they preferably include an upwardly bent end portion serving as a reinforcement for the insertion tongues and as an aid during insertion. While the drawing shows the pivot axis to be located at the contact points between the insertion tongues 4 and the collars 5 in the slots 6, it should be understood that this embodiment can be modified by placing a pivot at a different point along the insertion tongues, or by providing flexible tongues, or by joining an inner and outer portion of the tongues with a hinge connection.

It should be understood, of course, that the foregoing disclosure describes only a preferred embodiment of the invention and that it is intended to cover all changes and modifications of this example of the invention which fall within the scope of the appended claims.

We claim:

1. In an automobile roof structure having therein a generally rectangular roof opening defining forward and rearward transverse edges, a movable rigid vent panel having a contour conforming to that of said roof opening and receivable within the same for substantially flush registration with the surface of the roof, a frame comprising a wall portion fixed with the under surface of said roof and depending therefrom parallel with, forwardly of, and contiguous to, said forward transverse edge, said wall portion having first and second slots spaced therealong and aligned parallel with said forward edge, first and second tongues secured to and projecting forwardly from said panel, for sliding projection in and through said first and second slots, respectively, to thereby enable pivoting of said panel from a first position essentially flush with the roof, to a second position with its rearward edge elevated above the roof, linkage means including a detachable pivot connection with said panel, adjacent said rearward edge, and operable to hold said panel in said second position, said panel in second position being removable from said roof, when said pivot connection is detached, by rearward translation to withdraw each tongue from its slot.

2. The roof structure of claim 1, said frame wall portion forming a flange extending continuously about and depending from the periphery of said roof opening in fixed relation with and secured to the lower surface of said roof structure.

3. The roof structure of claim 2, the flange of said frame wall portion being bent horizontally inwardly, then upwardly to define a rain channel extending continuously about the periphery of said roof opening, said linkage means being disposed within said channel when said panel is in said first position.

4. The roof structure of claim 1, first and second rubber collars each secured to and extending about the periphery of each said slot, respectively, to essentially obturate the same, each said tongue passing through its slot in contact only with its respective collar and in spaced relation with the edges of the slots, each said tongue being fixedly attached to the under surface of said panel at the forward edge thereof.

5. The roof structure of claim 4, each said tongue having its forward part offset downwardly from the lower surface of said panel and terminating forwardly in a straight normally horizontal run followed by a bent end extending upwardly and forwardly.

* * * * *